US005888341A

United States Patent [19]

[11] Patent Number: 5,888,341

[45] Date of Patent: Mar. 30, 1999

Lafond

[54] APPARATUS FOR THE AUTOMATED APPLICATION OF SPACER MATERIAL

[76] Inventor: Luc Lafond, 23 Woodvalley Drive, Etobicoke, Ontario, Canada, M9A 4H4

[21] Appl. No.: 751,736

[22] Filed: Nov. 18, 1996

Related U.S. Application Data

[63] Continuation-in-part of Ser. No. 449,744, May 25, 1995, abandoned.

[30] Foreign Application Priority Data

May 26, 1994 [CA] Canada .................................. 2124598

[51] Int. Cl.$^{6}$ .......................... B32B 35/00; B32B 31/00; C03C 27/06

[52] U.S. Cl. .......................... 156/468; 156/101; 156/107; 156/109; 156/211; 156/212; 156/486; 156/257; 156/523; 156/574

[58] Field of Search .................................... 156/489, 468, 156/486, 513, 523, 574, 109, 101, 102, 106, 107, 459, 358, 360, 361, 363, 257, 211, 212; 226/172

[56] References Cited

U.S. PATENT DOCUMENTS

| | | | |
|---|---|---|---|
| 3,733,327 | 5/1973 | Wolff | 156/109 |
| 4,769,105 | 9/1988 | Lisec | 156/468 |
| 5,368,212 | 11/1994 | Koch | 226/172 |
| 5,472,558 | 12/1995 | Lafond | 156/523 |

*Primary Examiner*—David A. Simmons
*Assistant Examiner*—Linda L. Gray
*Attorney, Agent, or Firm*—McFadden, Fincham

[57] ABSTRACT

An apparatus for applying an adhesive spacer material to a substrate, such as a glass lite, for the manufacture of insulated windows. The apparatus includes an infeed and an outfeed conveyor for advancing a glass lite, and a transverse beam on which is mounted a first travelling applicator head and a second stationary applicator head. A first and second feed reel are provided to supply spacer material to their respective applicator heads. The travelling applicator head is adapted to move transversely across the conveyor, rotationally through 180°, and vertically above the substrate. The stationary applicator head is adapted to apply a length of spacer material in a straight pattern simultaneously with the travelling head as the substrate is advanced by the conveyor. The travelling applicator head applies spacer material to three sides of the substrate, cutting notches in the spacer material and rotating 90° at the corners of the substrate. The stationary applicator head applies spacer material to the fourth side of the substrate. The apparatus provides the mechanism necessary to produce tight accurate corners, including a punch for notching the spacer material in the corner area, and cooperating pairs of grippers for forming accurate fold placement of the spacer material at the corners. The traveling head has a lead gripper and a lag gripper, each is of a pair of grippers. The grippers form an application channel for positioning the spacer material on the substrate, and the grippers are mounted for pivotal movement relative to the other.

15 Claims, 15 Drawing Sheets

APPARATUS FOR THE AUTOMATED APPLICATION OF SPACER MATERIAL

This is a continuation-in-part application of U.S. Ser. No. 08/449,744 filed May 25,1995, now abandoned.

FIELD OF THE INVENTION

This invention relates to an apparatus and method for the automated application of spacer material to a substrate such as a glass lite for the manufacture of double-glazed or insulated windows.

BACKGROUND OF THE INVENTION

Double-glazed or other sandwich type insulated windows are made by applying a spacer material to the periphery of a first glass lite and then applying a second glass lite over the spacer. A desiccant in the spacer serves to absorb any moisture in the trapped air. In order for a window to maintain its integrity, the seal between the glass lites must prevent any further moist air from entering the insulating space. The seal is established by the spacer which is adhesive on opposite edges, and later by a further application of sealant.

The spacer serves to maintain the separation between the glass lites in which the insulating air space is trapped. The spacer generally includes materials such as butyl polymers, silicones, polyvinyl polymers as well as strip metal and other materials. Commonly a strip of flexible insulating material of a cellular or solid structure, such as butyl rubber or silicone foam, is used which includes an impregnated desiccant, a polyester, eg. MYLAR™, vapour barrier, and pressure sensitive adhesive on opposite edges for sealing to the glass. These spacer materials have an elastic memory and therefore stresses such as being wound around the delivery spool, or bent around curves or corners stretch the spacer unevenly resulting in the spacer trying to return to its natural position after it has been applied.

At present, most double glazed windows are formed by manually applying a length of spacer material about the periphery of the glass. Various types of manual tools are known for this purpose, requiring the operator to move the tool along the sides and ends of the glass lite while feeding a length of the strip or spacer material through or around the tool.

Typical of the arrangements known in the prior art is the device shown in U.S. Pat. No. 4,756,789, issued to Kolff, Jul. 12, 1988. The device provides a plurality of rollers between which is fed spacer material. A guide is provided on the body of the applicator for evenly measuring the spacing around the periphery of the substrate as the spacer is applied. Although a useful arrangement for limited production, this apparatus would be ineffective in an environment where high volume production is required.

As the insulated window industry has developed and improved, consumer tolerance for irregularities in window construction has diminished. The flexible spacer materials bend poorly around corners causing a visible bulge in the interior of the window. Commonly the practice for forming corners is to lift the applicator tool, bend the spacer material, replace the applicator tool and continue to apply spacer. In addition to forming a poor rounded corner, this practice also risks forming an incomplete seal with the glass in the corner areas where the tool is lifted and the adhesive is not pressed against the substrate by the tool. As discussed above, a complete seal is necessary to forming an insulating window. If the seal is broken or incomplete much of the insulating capacity of the window is lost and the glass becomes obscured by condensation.

Gradually the industry has turned to automation in insulated window production in order to increase the speed of production and uniformity of the product, and to reduce production costs. Briefly, the line process for automated or semi-automated window assembly includes a number of station steps. First the glass is washed; it is then fed through an aligning process to the spacer applicator; spacer is applied to the periphery of the glass; a glass lite with spacer applied is aligned with a second clean lite for sandwich assembly; the assembly is then advanced through a pressing roller; the edges are sealed; and the unit is placed in a frame. In an automated process it is important to limit the time in each station because all units advance at the rate of the slowest station. Once each station is occupied, a complete unit is produced from the line, for example, every 20 seconds, or a period equivalent to the duration of the longest station.

An apparatus for a partially automated system which has been proposed in the art for applying an adhesive spacer material to a substrate is disclosed in Lisec, U.S. Pat. No. 4,769,105, issued Sep. 6, 1988. The Lisec apparatus provides a spacer application head which is movable vertically on a carriage member. The glass to which the spacer is applied is movable on a pair of cooperating conveyors in a horizontal direction. In operation the head travels up one end of the glass, the glass is advanced while the head continues to apply spacer, the head travels down the other end, and the glass is returned in the horizontal direction to apply spacer to the fourth side. Thus the head travels the complete periphery of the glass and the operation finishes with the glass in its original starting position. This movement of the glass forward and back is time consuming. At each corner the feed of spacer material is held by a single gripper and the head is rotated. As a result the spacer material is bent, but no means is provided to ensure placement of the corner nor to ensure a good seal in the corner area. Although this patent recognizes the need for sharp corners, those formed by this apparatus still bulge, as is found with the hand applicator. Further, the Lisec device subjects the spacer material to significant stresses of bending and twisting which will deform the spacer making a square, even application impossible. The arrangement is likely more efficient than a hand-held apparatus. However, there is still a need for an apparatus to automatically apply spacer to a glass lite in window assembly with greater efficiency, and in particular to form better corners.

With the present invention, Applicant has developed a method and apparatus for automated application of spacer material to substrates, especially glass. More particularly, the method and apparatus of this present invention are intended to automatically apply spacer material to glass lite assemblies suitable for in-line production.

Advantageously, the present method and apparatus provide the mechanism and steps necessary to produce tight accurate corners, including a punch for notching the spacer material in the corner area, and a cooperating pair of lead and lag grippers for forming accurate fold placement.

Furthermore, the present method and apparatus according to the present invention permit the fabrication of a high volume of insulated glass assemblies with a low level of manual intervention and skill required to operate the apparatus. As a result, an improved product is produced at greater cost efficiency with less safety risk to operators.

SUMMARY OF THE INVENTION

One object of the present invention is to provide an efficient automated process and apparatus for applying adhesive strip spacer material to a substrate.

A further object of the present invention is to provide an apparatus and process for applying the spacer material around a corner ensuring a good seal to the substrate in the corner area and placing a tight corner in a predetermined location without excess bulging material.

A further object of the present invention is to provide an apparatus and process for applying spacer material to a substrate in a quick and time efficient manner.

A further object of the present invention is to provide an apparatus and process for applying spacer material to a substrate within small tolerances for more accurate placement and good sealing contact with the substrate.

Accordingly, the present invention comprises a travelling applicator head for applying adhesive spacer to a substrate in a spacer application station in the production of insulated windows, comprising:

- a traveller and drive means for supporting the applicator head at a distance from the substrate for selective transverse reciprocating movement;
- a central housing rotatively supporting the applicator head on the traveller;
- a lead gripper;
- an independently moveable lag gripper pivotally interconnected with the lead gripper defining, in combination with the lead gripper, an application channel for positioning the spacer material on the substrate.

A preferred embodiment of the present invention advantageously comprises an apparatus for applying adhesive spacer material to a substrate, comprising:

- a support means for supporting the substrate;
- a beam oriented transversely to the support means;
- at least one travelling applicator head for applying spacer material to the substrate supported on the beam spaced from the substrate;
- at least one feed reel for supplying spacer material to the at least one travelling applicator head;
- means for advancing the at least one travelling applicator head relative to the substrate;

wherein the at least one applicator head includes:

- drive means for providing reciprocal movement of the at least one applicator head on the beam;
- a central housing secured to the drive means about which the at least one applicator head is rotatable;
- a lead gripper and a lag gripper pivotally interconnected about the central housing defining an application channel for receiving the spacer material and applying it to the substrate.

A further preferred embodiment additionally comprises a stationary applicator head for applying a length of spacer material while the substrate is advanced relative to the stationary head and a feed reel for supplying spacer material to the stationary applicator head.

A preferred method according to the present invention comprises a method of applying an adhesive spacer material to the perimeter of a substrate, the substrate having a first and a second lateral side and a first and a second transverse side, in the assembly of insulated windows, comprising the steps of:

a. initializing applicator means in a home position;

b. conveying a substrate to an initial home position;

c. advancing the applicator means transversely across the substrate applying spacer material to a first transverse side of the substrate;

d. forming a corner with the spacer material, comprising
   - gripping a portion of the applied spacer material while simultaneously rotating a leading portion of the applicator means to fold the spacer material;
   - gripping an adjacent portion of spacer material at a prescribed angle to the gripped applied spacer to place the folded spacer material precisely on an adjacent side of the substrate;
   - releasing the gripped spacer material; and
   - rotating a trailing portion of the applicator means into alignment with the leading portion of the applicator means;

e. advancing the substrate relative to the applicator means while applying spacer material to a lateral side of the substrate;

f. optionally repeating steps c, and/or d, and/or e sequentially or simultaneously to apply spacer material to each lateral and transverse side;

g. cutting off the length of spacer applied by the applicator means; and h. reconfiguring the applicator means for the next substrate.

The present invention has numerous advantages over manual or other types of spacer element application to substrates. Primarily, the apparatus provides an improved product having tight sealed corners. The present invention also provides an apparatus which can be adapted for in-line production, thus eliminating slow-downs and stockpiling of materials. Speed in production is gained through the use of more than one applicator head, and in the use of the conveyor to advance the glass during application so that the glass with spacer leaves the applicator station from an advanced position in the production line. Still further, the present invention provides an economical apparatus which has a minimal number of movements and consequently, is simpler to construct and operate.

Having thus generally described the invention, reference will now be made to the accompanying drawings illustrating preferred embodiments in which like numerals are used to designate like elements.

BRIEF DESCRIPTION OF THE DRAWINGS

FIG. 9 illustrates the travelling applicator head in the home position with the glass in place to begin application of spacer, and the stationary head in its resting position;

FIG. 10 illustrates the stationary head advanced to the home position so that both applicator heads are in position to apply spacer to opposite sides as glass advanced by conveyors;

FIG. 11 illustrates the applicators completing application of spacer to the opposite sides of the glass;

FIG. 12 illustrates the travelling head applying spacer to the final end of the glass and the stationary head returned to its resting position; and FIG. 13 illustrates the travelling applicator returned to the home position and the completed glass lite being removed by the outfeed conveyor.

Like numerals are used in the drawings to denote like elements.

DETAILED DESCRIPTION OF THE PREFERRED EMBODIMENTS

Figure 1:
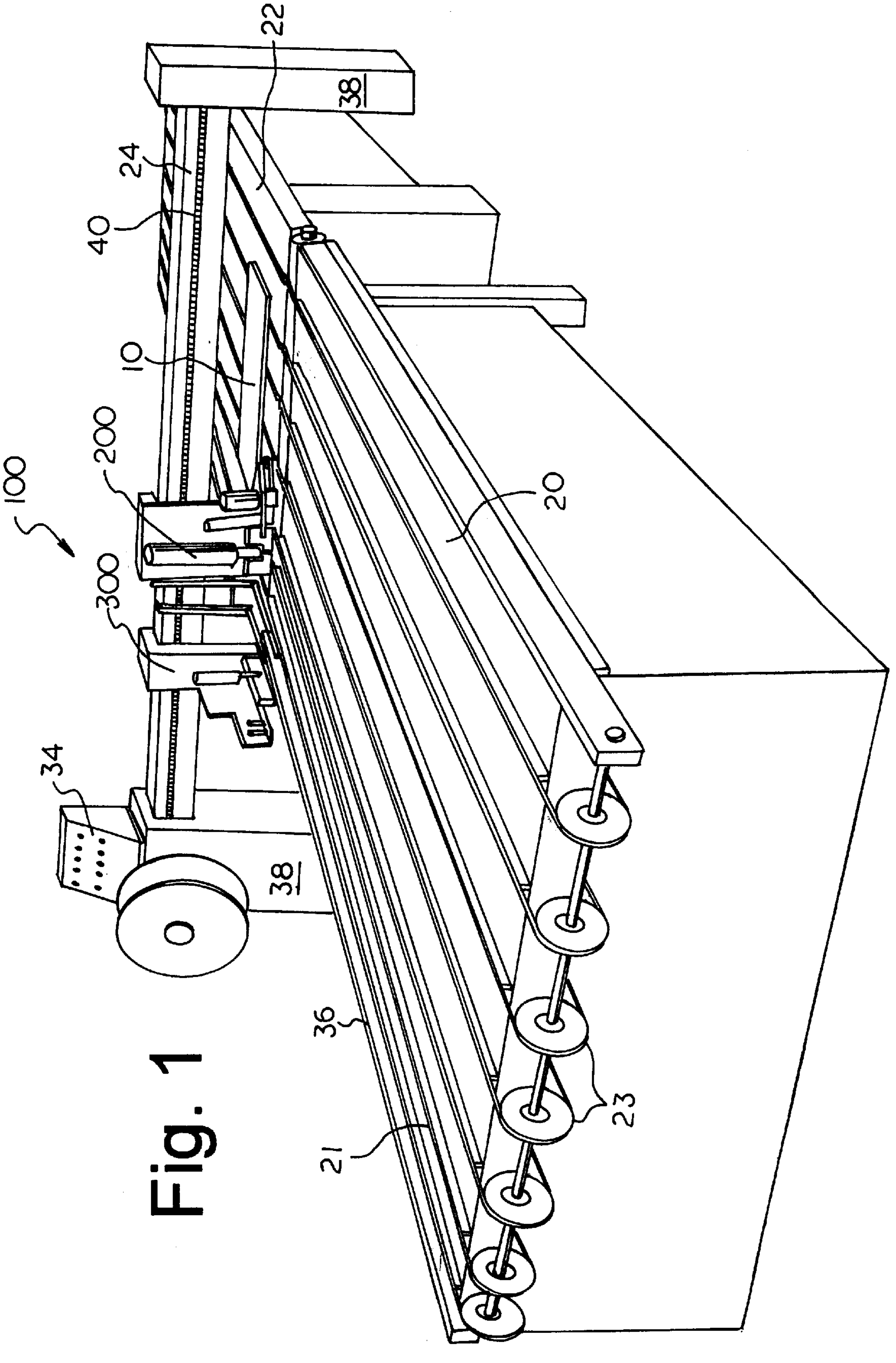
FIG. 1 is a perspective view of an apparatus according to the present invention for use in an insulated glass assembly production line.

A preferred embodiment of the present invention will be described with reference to FIGS. 1–8A. This apparatus applies adhesive spacer material to the surface of a glass lite adjacent its periphery in a station of an automated or semi-automated window assembly environment. As the majority of windows produced are rectangular, it is to this requirement that the present apparatus is configured. The apparatus can also be adapted to other shapes and operations as will be discussed later.

The apparatus generally indicated 100 is shown in various perspective views in FIGS. 1–4. The apparatus comprises an infeed conveyor 20 and an outfeed conveyor 22 for advancing a glass lite 10 and a transverse beam 24 on which is mounted a first travelling applicator head 200 and a second stationary applicator head 300. A first feed reel 26 and a second feed reel 28 are provided to supply spacer material 30 to the applicator heads 200, 300.

The conveyors 20, 22 comprise a substantially horizontal conveying surface composed of a plurality of individual belts 21, which are, for example rubber or a similar non-slipping surface and which are individually mounted on rollers 23, the rollers 23 being mounted for rotation on shafts which are driven by any suitable motor. The conveyors 20, 22 further include an alignment guide 36 comprising a raised edge to ensure that the glass lite 10 is positioned in the correct orientation. The belts 21 of the infeed conveyor 20 may advantageously be driven at a minimal angle to direct the glass 10 against the alignment guide 36. As configured for rectangular windows, correct placement of the spacer 30 is dependent on the initial positioning and alignment of the glass substrate 10. As illustrated in FIG. 1, the infeed conveyor 20 and out feed conveyor 22 comprise separate belt conveyors, so that timing of the line operation downstream from the spacer applying station 100 can be separately controlled. It will be appreciated that any suitable conveying surface, such as single belt arrangements, air flow arrangements, caster arrangements etc. may be employed.

The transverse beam 24 is a structure secured relative to the conveyors 20, 22 at right angles to the direction of travel, positioned above the conveyor surface on vertical standards 38. The transverse beam 24 includes an endless belt 40 for advancing the travelling head 200 to apply spacer 30. Stationary head 300 is also advanced into position on the beam 24, for example, by an pneumatic cylinder, or any appropriate drive means. The CPU controller 34 is provided on one of the standards 38. In addition one of the standards 38 rotatably mounts a first feed reel 28 which carries a supply of spacer material 30 for the applicator head 200. An additional feed reel 26 is provided on a separate standard 39 or on a moveable support for supplying spacer material 30 to the travelling applicator head 300.

At least two feed reels 26, 28 comprise large spools of spacer material 30 as it is supplied from the manufacturer. The spacer material 30 is soft and deformable. It is therefore necessary to feed the spacer 30 from the heavy spools without stretching it or causing other damage. The reels 26, 28 are mounted on spindles 42 which are chain driven. The drive cooperates with sensors to continuously measure out a sufficient length of spacer material 30 to supply to the applicator head 200, 300 without resistance. The adhesive spacer material 30 is provided on the spool from the manufacturer with protective plastic liner 33 covering the adhesive on either edge. Before the spacer 30 can be fed to the applicator heads 200, 300 this liner 33 must be removed.

Figure 2:
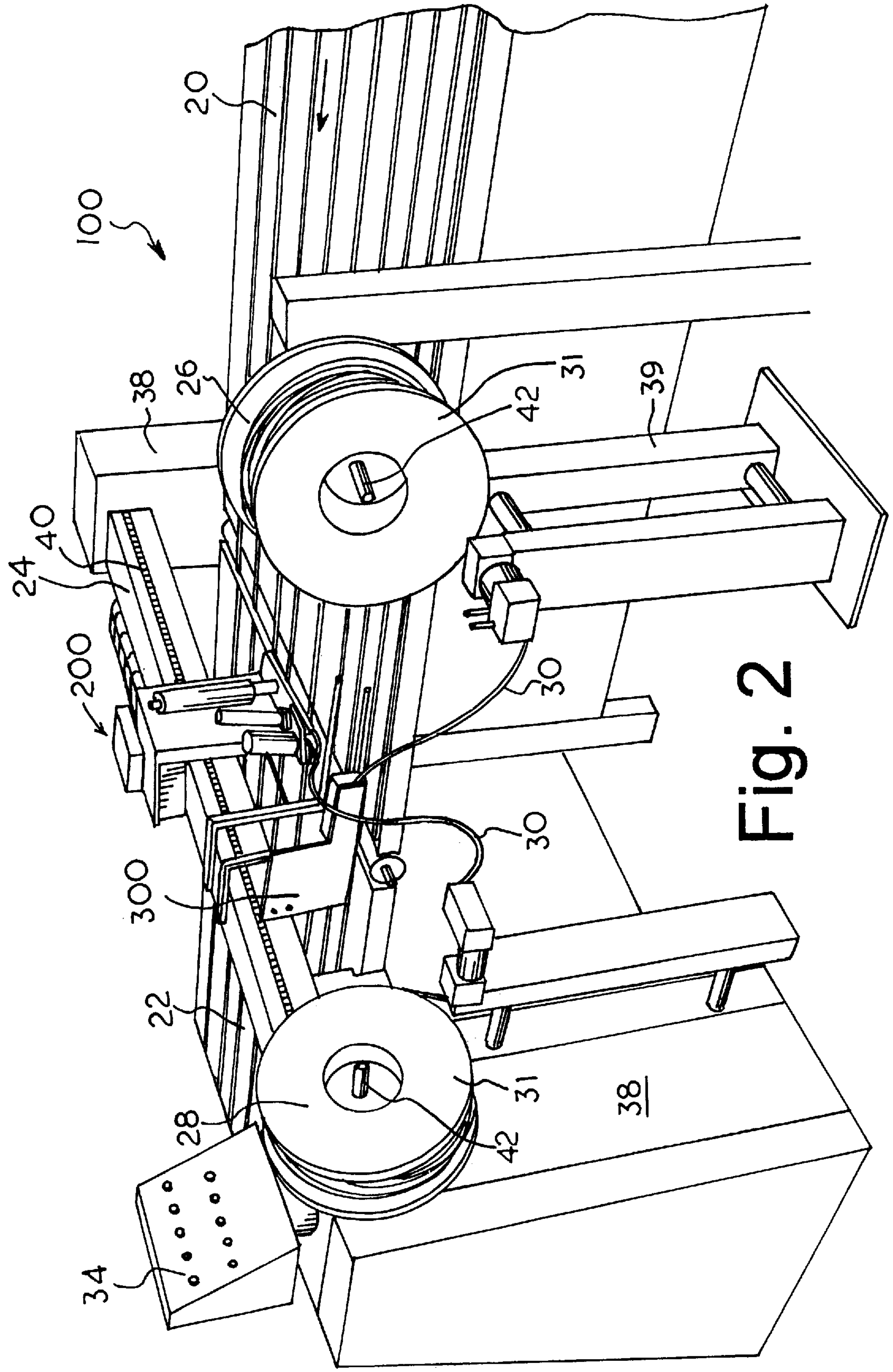
FIG. 2 is a perspective view of the apparatus of FIG. 1 showing in addition the feed reels of the spacer material.
Figure 2A:
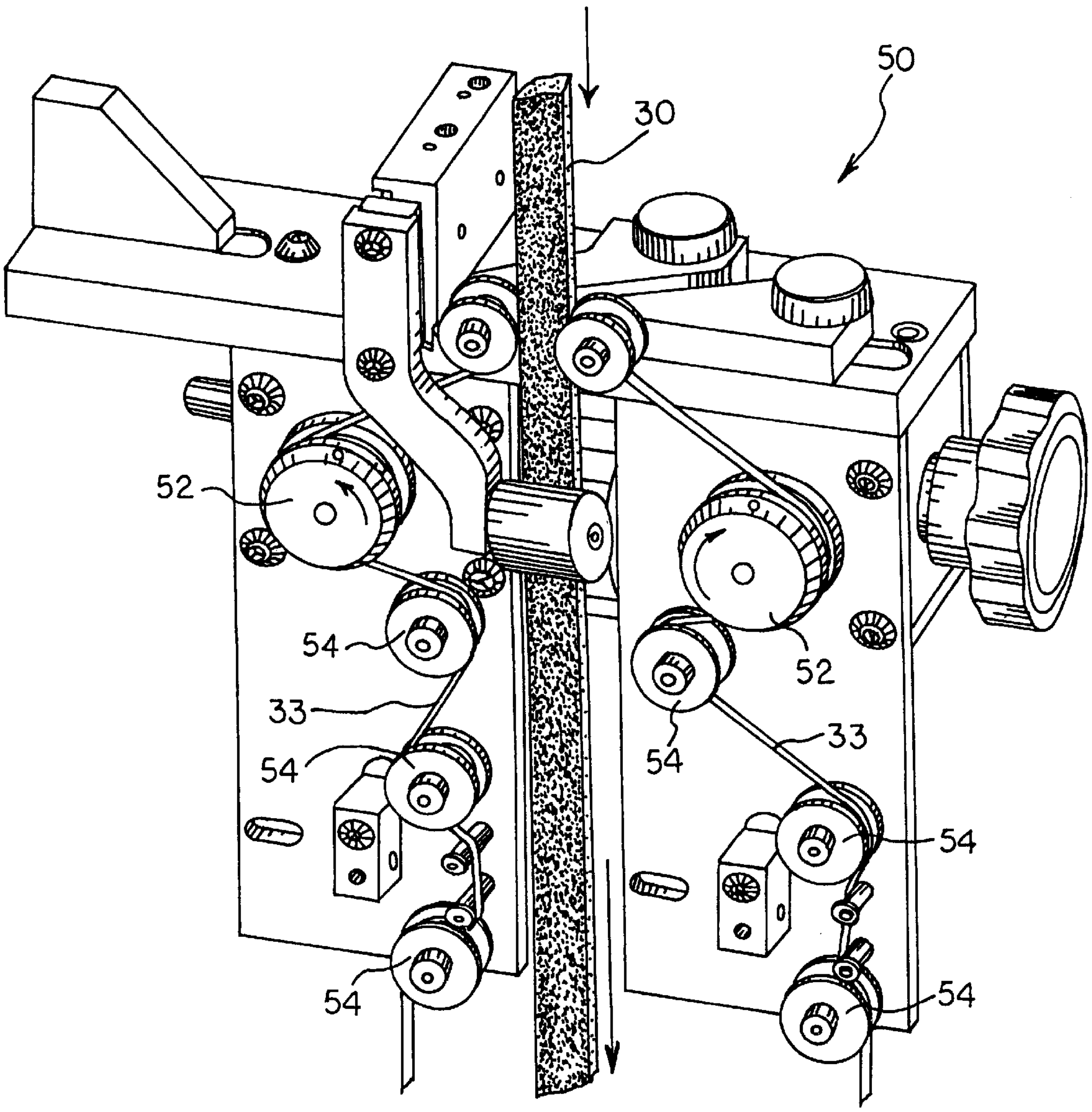
FIG. 2A is a partial view of a liner removing device for cooperation with the feed reels.
Figure 3:
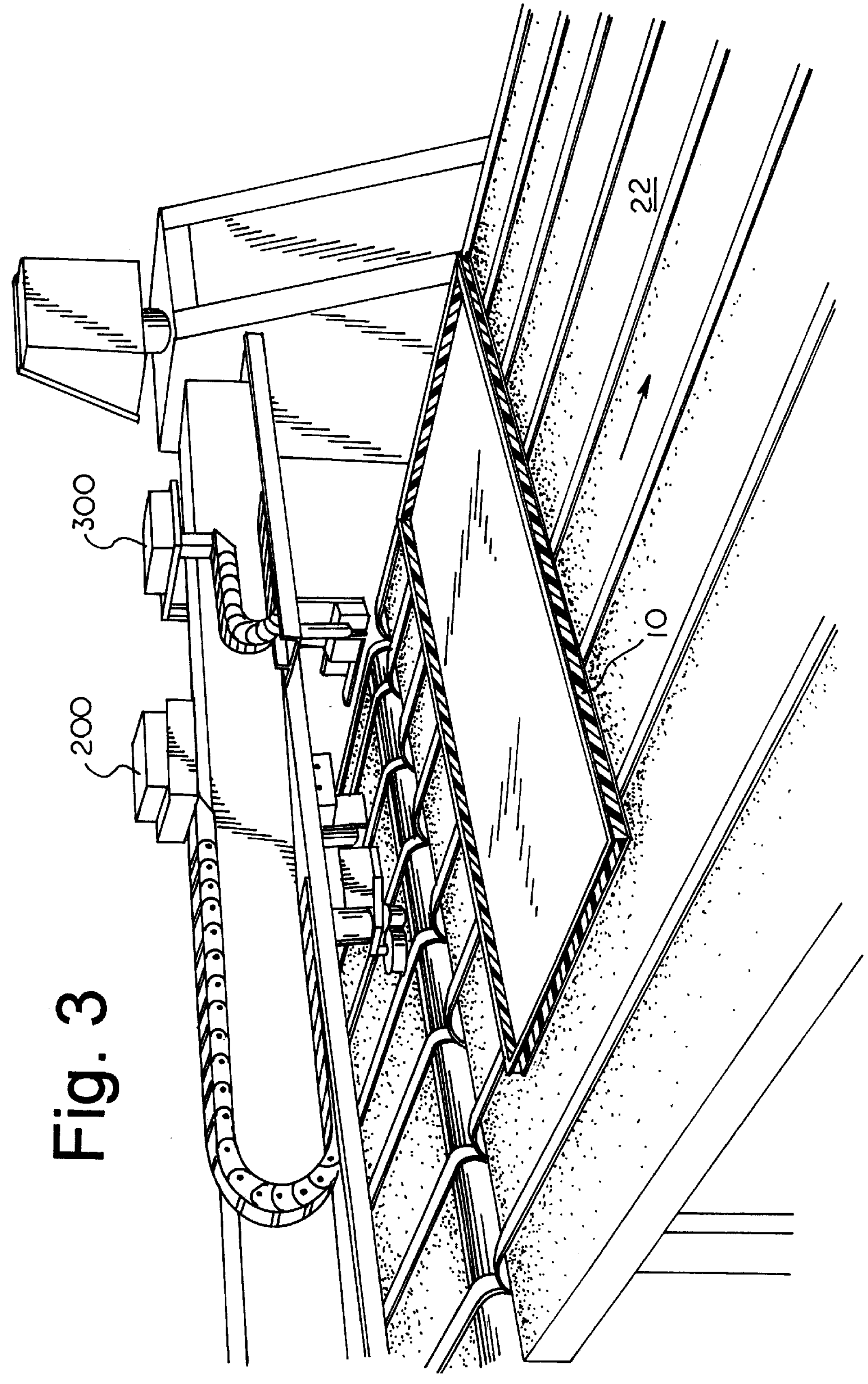
FIG. 3 is a perspective view of the discharge side of the apparatus with the support beam for the applicator heads being shown which extends transversely over the conveyors.

FIG. 2A illustrates a liner removing device 50 for use with the feed reels 26, 28. A liner removing device 50 is incorporated into the apparatus 100 in cooperation with each feed reel 26, 28 and can be installed within the reel standards 38, 39, as a part of the conveyor tables 20, 22 or in any other convenient location. The device 50 includes a pair of rotating wheels 52, driven in the opposite direction to the advance of spacer material 30, which separate the liner 33 from both edges of the spacer 30 and divert the liners 33 over a series of rollers 54. The liners 33 are then drawn under vacuum into a collection container. This is preferably accomplished by providing a pneumatic feed from the main pneumatic system into a venturi type vacuum. Clean removal of waste material is important for automated production to prevent contamination which could require stopping production or which may pass unnoticed into the finished product. Because of the strong adhesive exposed on the spacer material, nearly all elements which come into contact with the spacer material must be made of non-stick materials such as TEFLON(™) or silicone.

Figure 5:
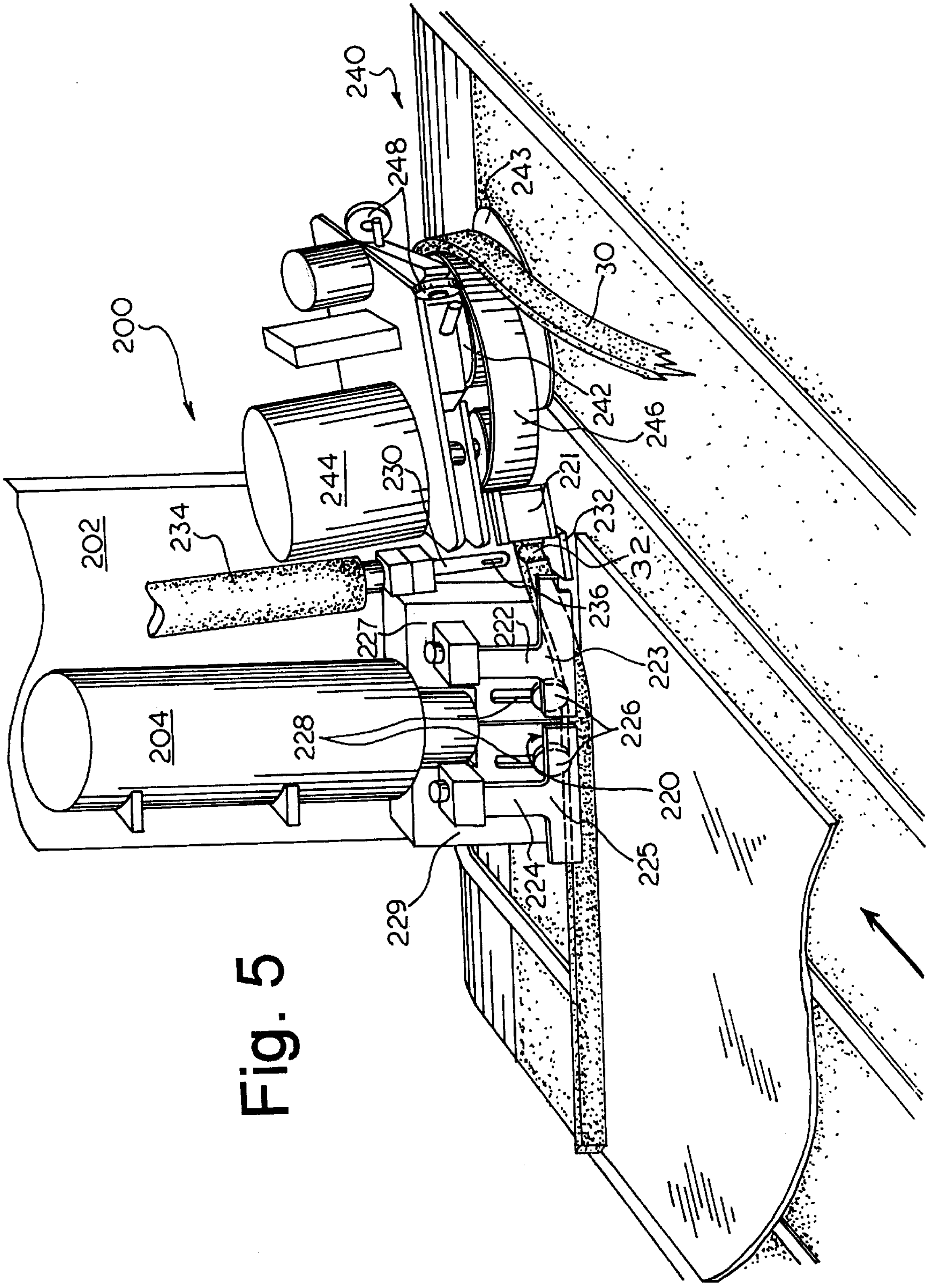
FIG. 5 is an enlarged view of a portion of the first travelling applicator head cutting a notch before forming a first corner.
Figure 6:
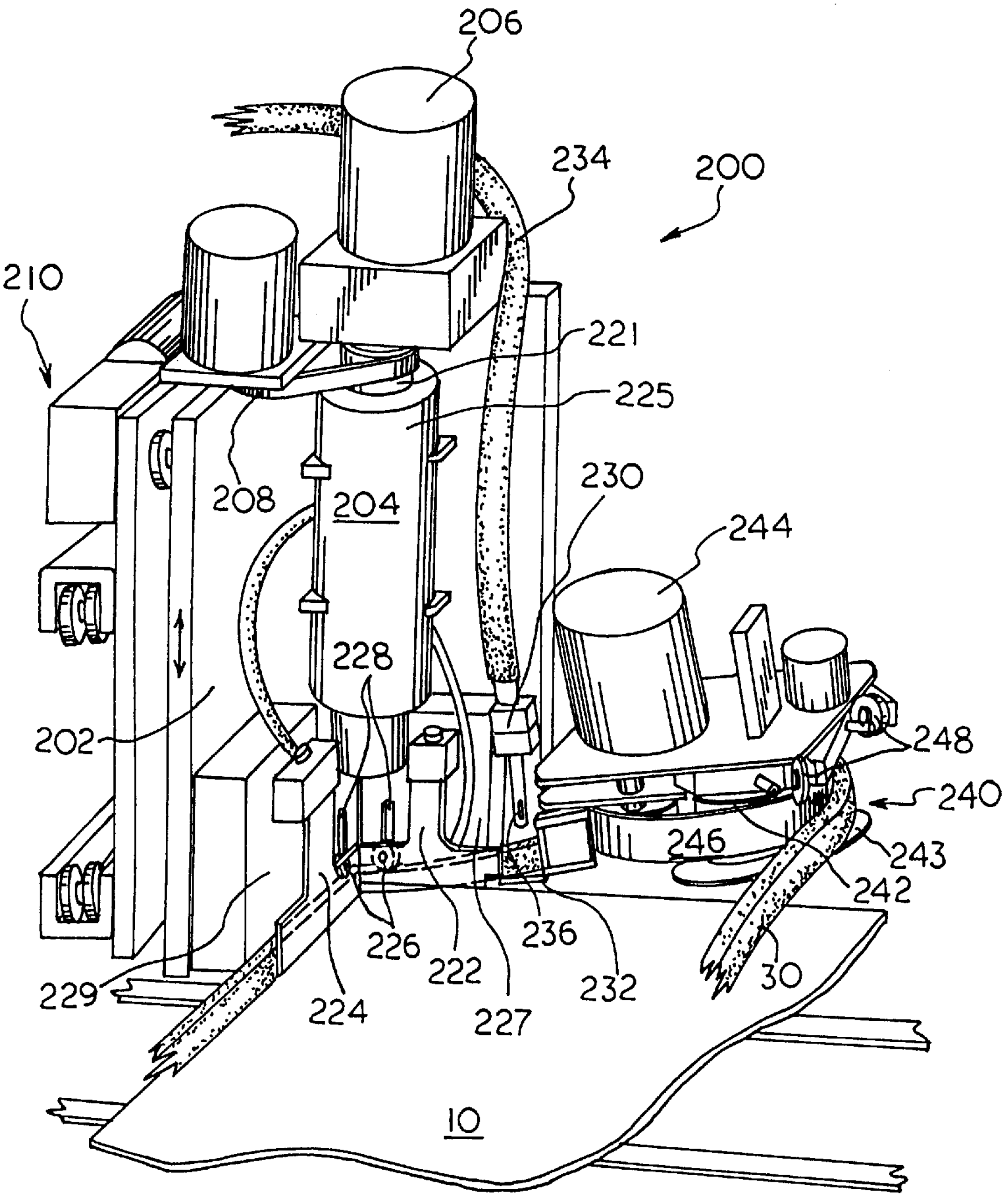
FIG. 6 is an enlarged view showing a portion of the first travelling applicator head forming a corner.
Figure 7:
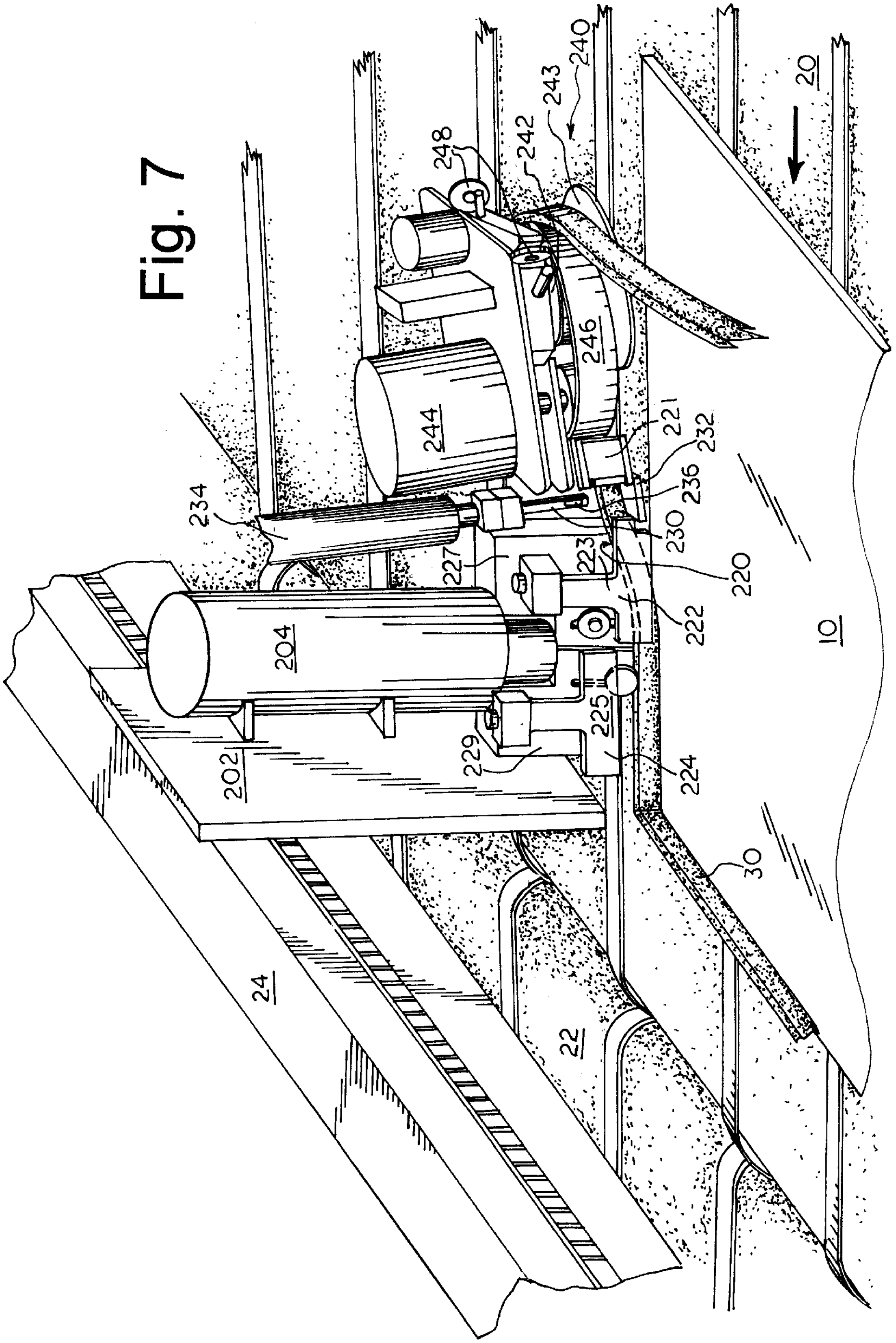
FIG. 7 is an enlarged view of the first travelling applicator head in position for application of a spacer to a second side of the substrate.
Figure 8:
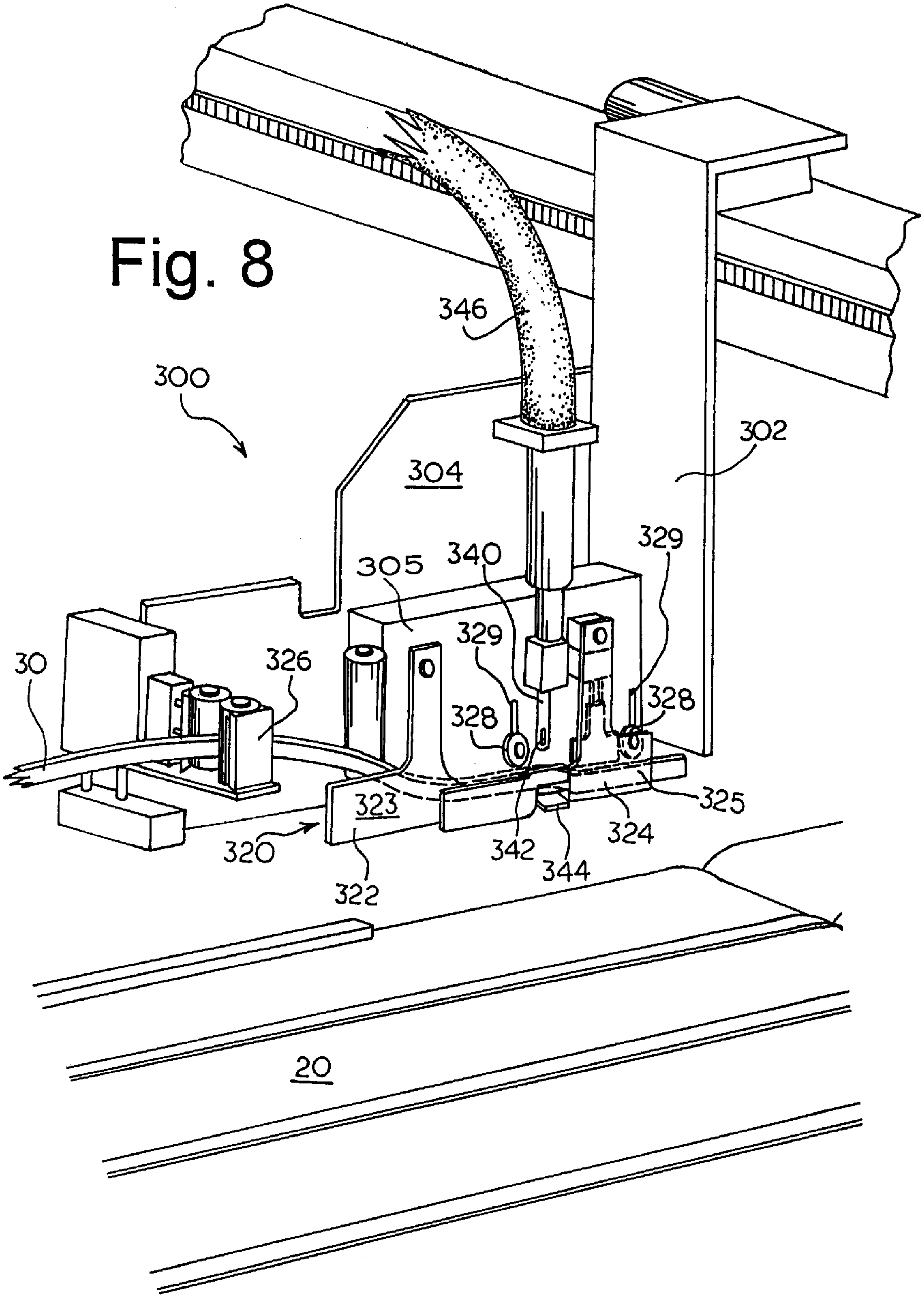
FIG. 8 is a perspective view showing the second stationary applicator head and the feed of spacer material.
Figure 8A:
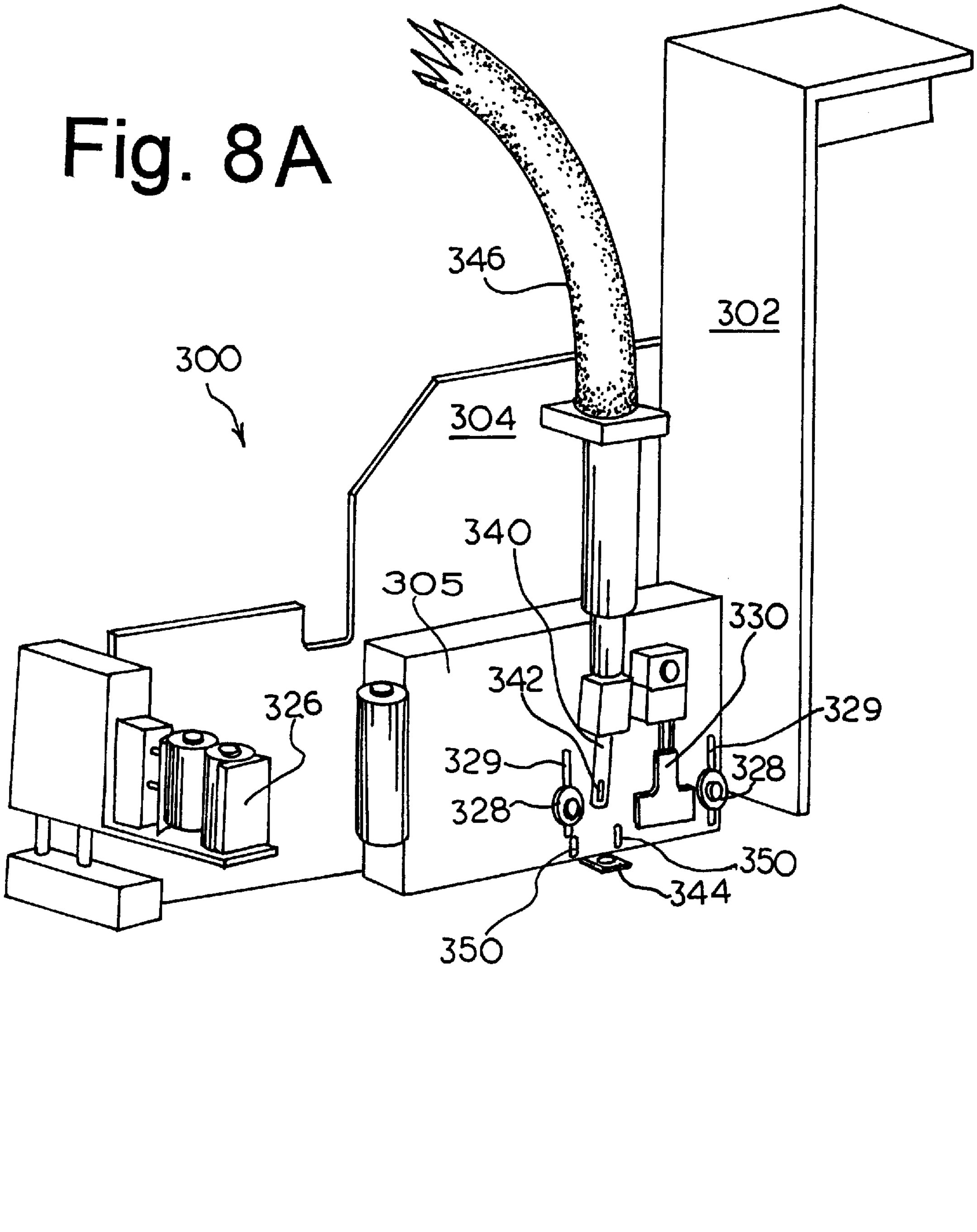
FIG. 8A is an enlarged view of the second stationary applicator head of FIG. 8 with the gripper plates removed to expose the internal structure.
Figure 9:
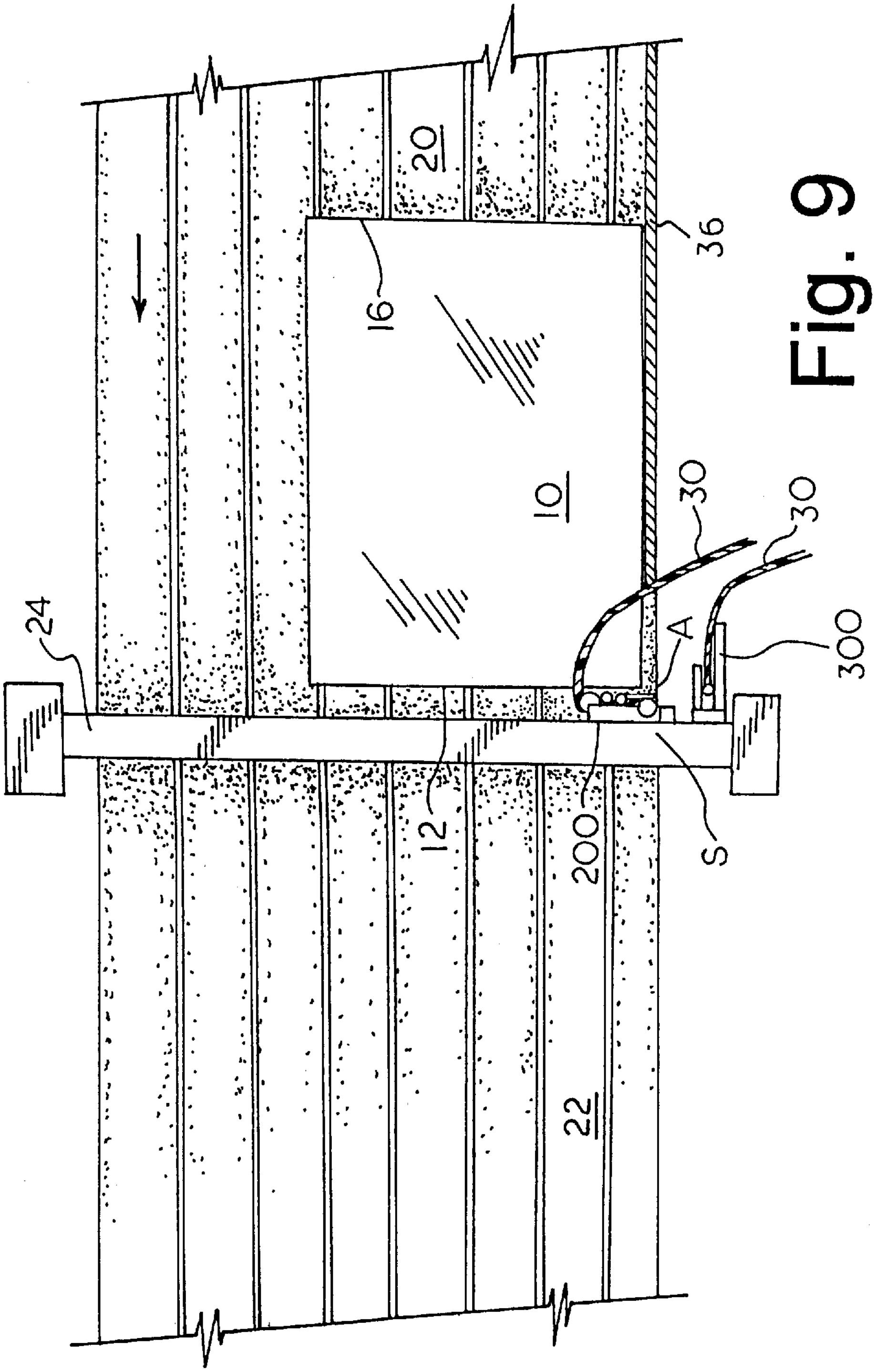
FIGS. 9 to 13 illustrate schematic top plan views of the application procedure in periodic steps, specifically.
Figure 10:
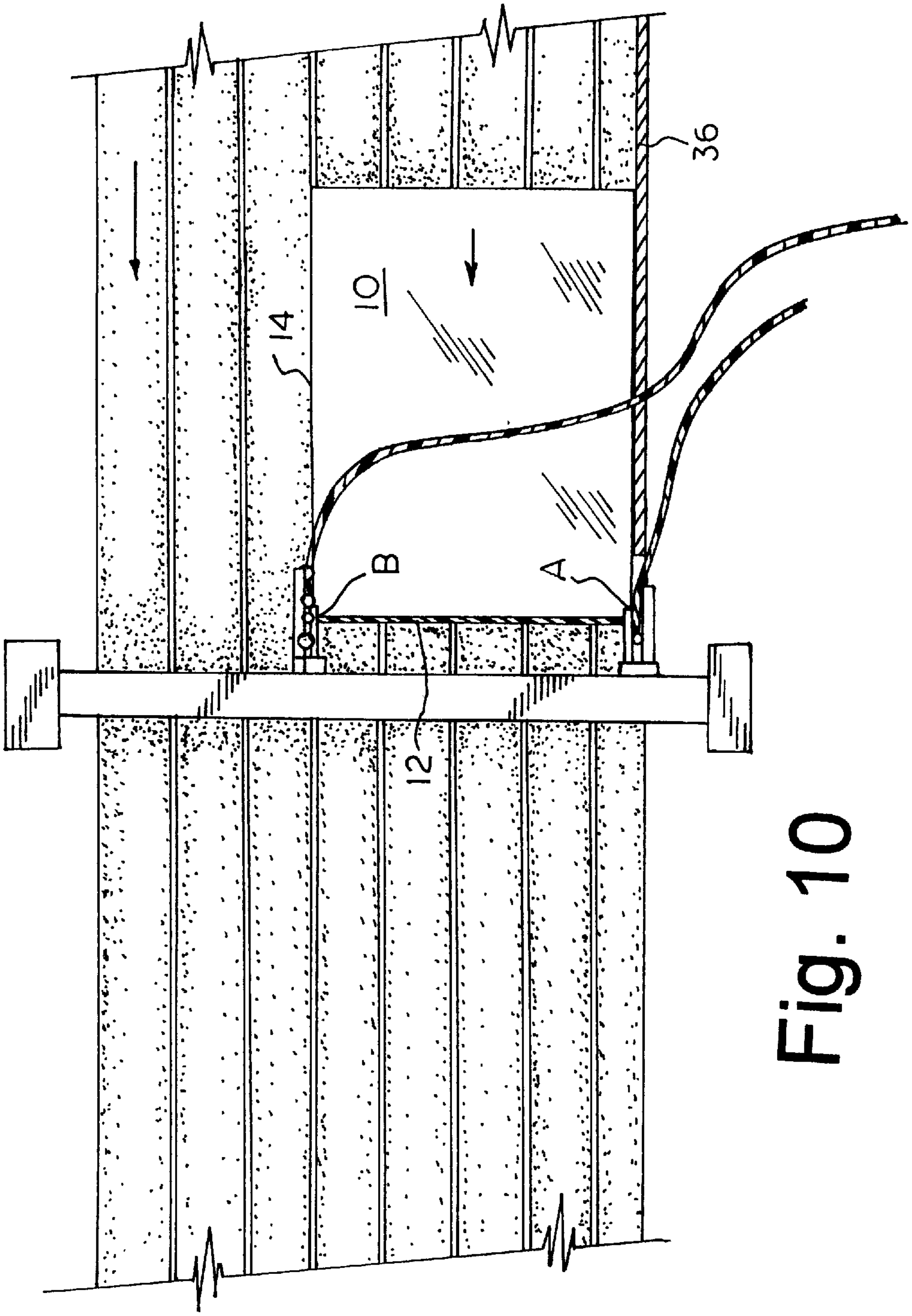
Figure 11:
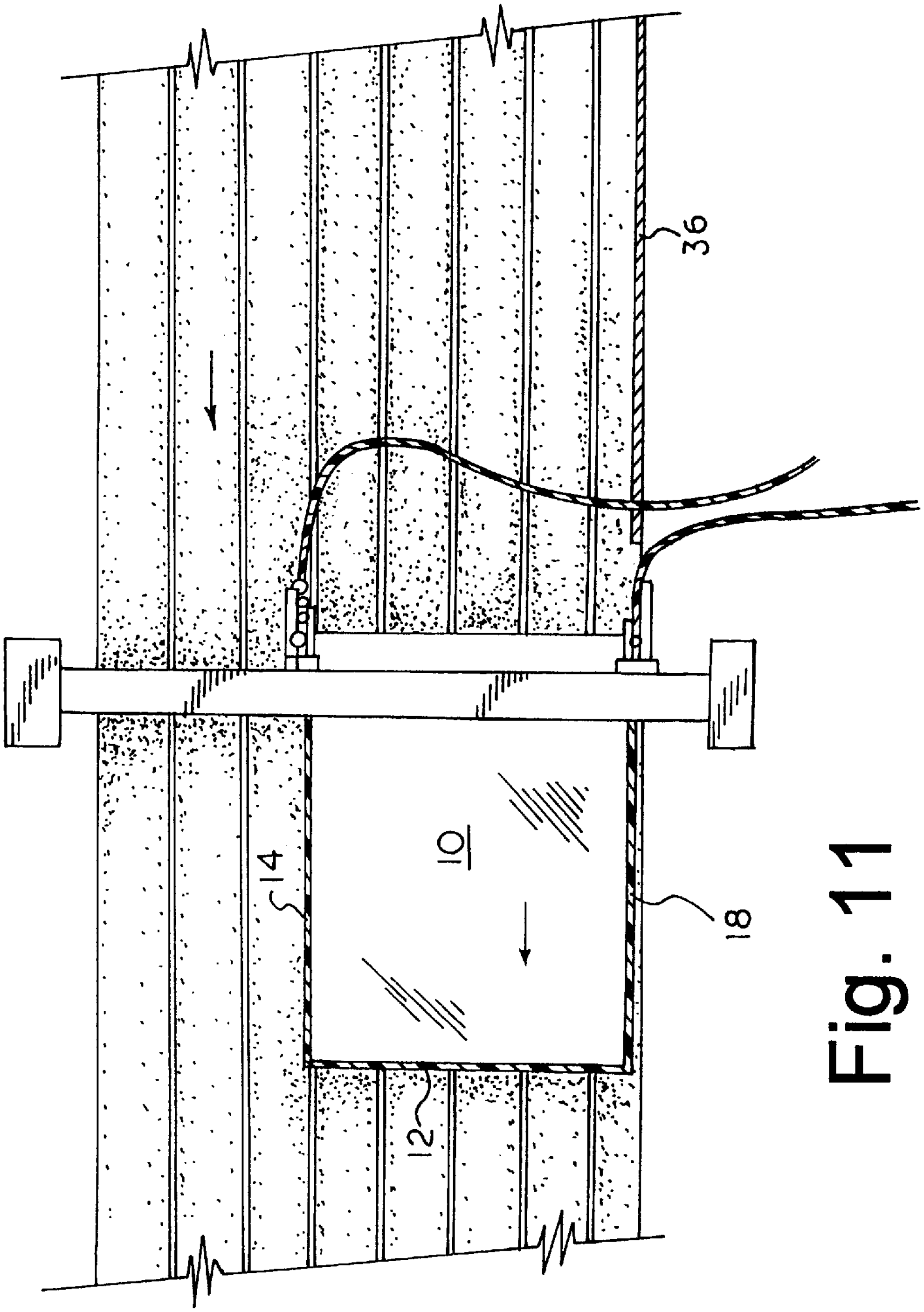
Figure 12:
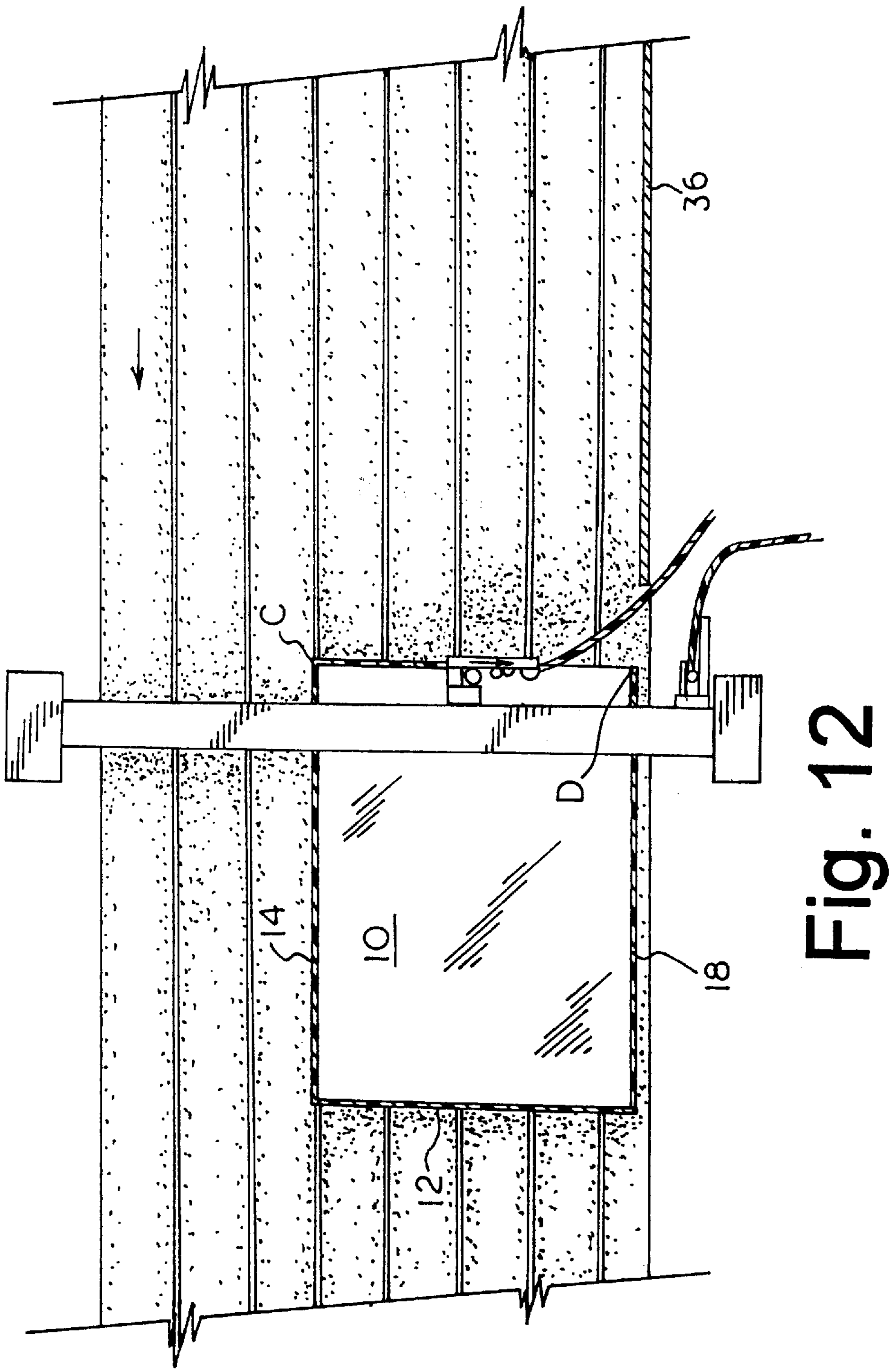
Figure 13:
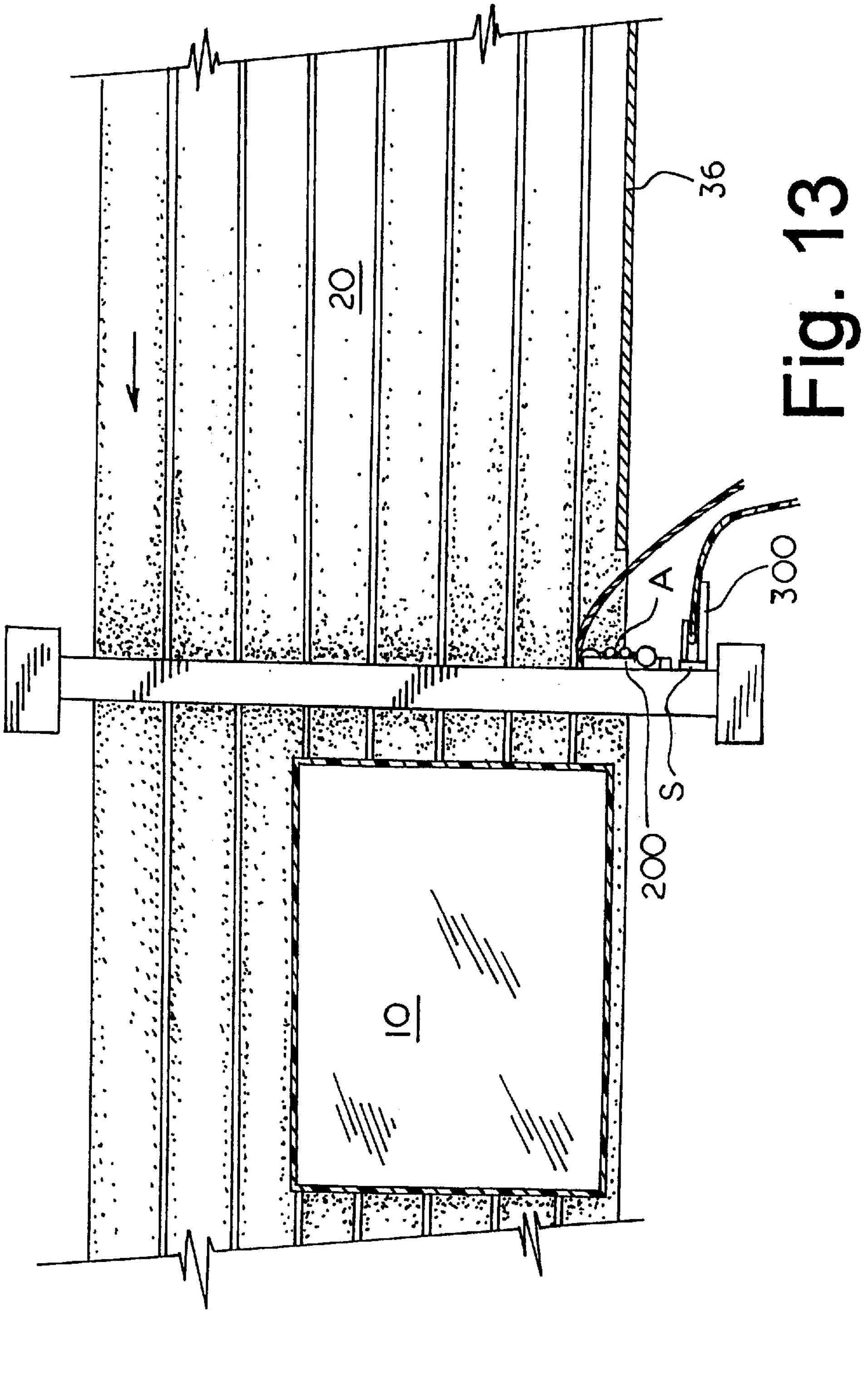

As a complete assembly, the first applicator head 200 shown in detail in FIGS. 5, 6 and 7 is moveable transversely in both directions across the beam 24. The first travelling applicator head 200 is secured to a traveller 202 which is advanced on the transverse beam 24 by the endless belt 40. In addition the entire assembly 200 is rotatable relative to the traveller 202 and transverse beam 24 through 180° around a central housing 204. Rotation of the leading portion of the assembly is actuated by a servo motor and gear box 206. A timing belt 208 driven by a servo motor 207 independently rotates the trailing portion of the assembly relative to the central housing 204 and with it the entire head assembly 200. The entire assembly 200 is also moveable vertically with a cam shaft, motor and gear box assembly 210 (shown clearly in FIG. 6) to lift the head 200 and spacer 30 above the glass during rotation around corners. Generally the first travelling head assembly 200 includes a feed drive 240, an application channel 220 and a punch and cutting mechanism 230.

The feed drive 240 is made up of a feed wheel 242 and an independent servo motor 244 which drives a pair of high friction belts 246 such as of sand paper and textured rubber. The belts serve to direct spacer material 30 into the application channel 220 of the applicator head 200, in cooperation with the main feed reel 26, to provide more controlled feed of spacer material 30 directly into the applicator head 200. The belts 246 cooperate with guide rollers 248 and a flange 243 on the feed wheel 242 to pick up and feed the spacer material 30 into the application channel 220 at a controlled rate and at an appropriate angle for application to the glass 10. An attractive feature is that the high friction belts 246 do not permit any slippage of the spacer material 30 and thus ensure positive traction without stretching the spacer material 30. Preferably pressure on the spacer in the feed drive 240 is controlled by a pneumatic cylinder which applies pressure to the high friction belts 246 adjustably to regulate the feed in response to the variable density of the spacer material 30. This also allows pressure on the spacer to be released completely if necessary, as for example during manual loading or unloading. As a further advantage, the use of a servo motor drive 244 has been found to be effective. The combination of friction belts 246 with adjustable pressure between them and a servo motor 244 for precise acceleration and deceleration equivalent to the speed of travel of the applicator head 200 have shown to be important to apply the spacer precisely to the glass without stretching or compressing it which could result in a seal failure. Although the use of a servo drive is favoured, it will be readily apparent to those skilled in the art that numerous other equally useful drive arrangements may be employed. The CPU controller 34 can further control the speed of the feed drive 240 in relation to the movement of the applicator head 200 in such a way that for different densities of spacer material 30, the operator can increase or decrease the speed to prevent stretching or compressing of the spacer.

From the feed drive 240, the spacer 30 is forced past a spring gate 221, or other suitable guide ensuring that the spacer 30 enters the application channel 220 in a vertical orientation. The channel 220 itself is defined by a lead gripper 222 and a lag gripper 224. The grippers 222,224 are pivotally inter-connected about the central housing 204. The central housing 204 comprises two concentric shafts the inner shaft 211 being connected to the lead gripper 222 and feed drive 240, the outer shaft 225 being connected to the lag gripper 224 to permit independent pivotal movement of the lag gripper 224 relative to the position of the lead gripper 222 and main head assembly 200 for forming corners. The tolerance of the channel 220 is very small to maintain a constant angle of application. The grippers 222, 224 include front plates 223, 225 which are independently moveable by pneumatic cylinders which cooperate with back plates 227, 229 to adjust the channel 220 width for different spacer materials 30 and to immobilize the spacer material 30 in the channel 220 for cutting and folding. The front plate 225 of the lag gripper 224 is also moveable in a vertical direction to allow the lag gripper 224 to be raised above the applied spacer 30 as the head 200 rotates at corners. The spacer material 30 is threaded from the feed drive 240 into the channel 220 defined by the lead and lag grippers 222, 224. Within the channel 220 associated with each gripper 222, 224 is a pressure wheel 226 which is moveable in a vertical slot 228. During application the wheels 226 impinge on the upper surface of the spacer material 30 directly, ensuring good adhesion to the glass 10. The applicator head 200 itself never touches the glass 10.

A pneumatically activated punch 230 is provided before the lead gripper 222 in the channel through which the spacer 30 is threaded, which serves to remove a notch 32 (shown in FIG. 5) from the spacer material 30 in the area where the corner is to be formed. The punch 230 comprises a circular blade located to remove a semi-circular notch 32 from the edge of the spacer material 30. In association with the punch 230 is an anvil 232 located under the spacer material 30 to support the spacer material 30 as it is cut. The pneumatic punch 230 cannot be struck against the glass 10 directly without damaging the glass 10. The anvil advantageously includes a projection of silicone or other suitable device for removing the core of spacer material 30 from the punch 230. An evacuator hose 234 is provided on the punch 230 for removing the plug of excess spacer material. A selectably operable slitter knife 236 engages with the punch blade 230 for cutting the finished length of spacer material 30 applied to the glass 10. Alternatively the circular knife 230 alone may also be used to sever the spacer at the end of an application being moveable from a notching position to a severing position.

Figure 4:
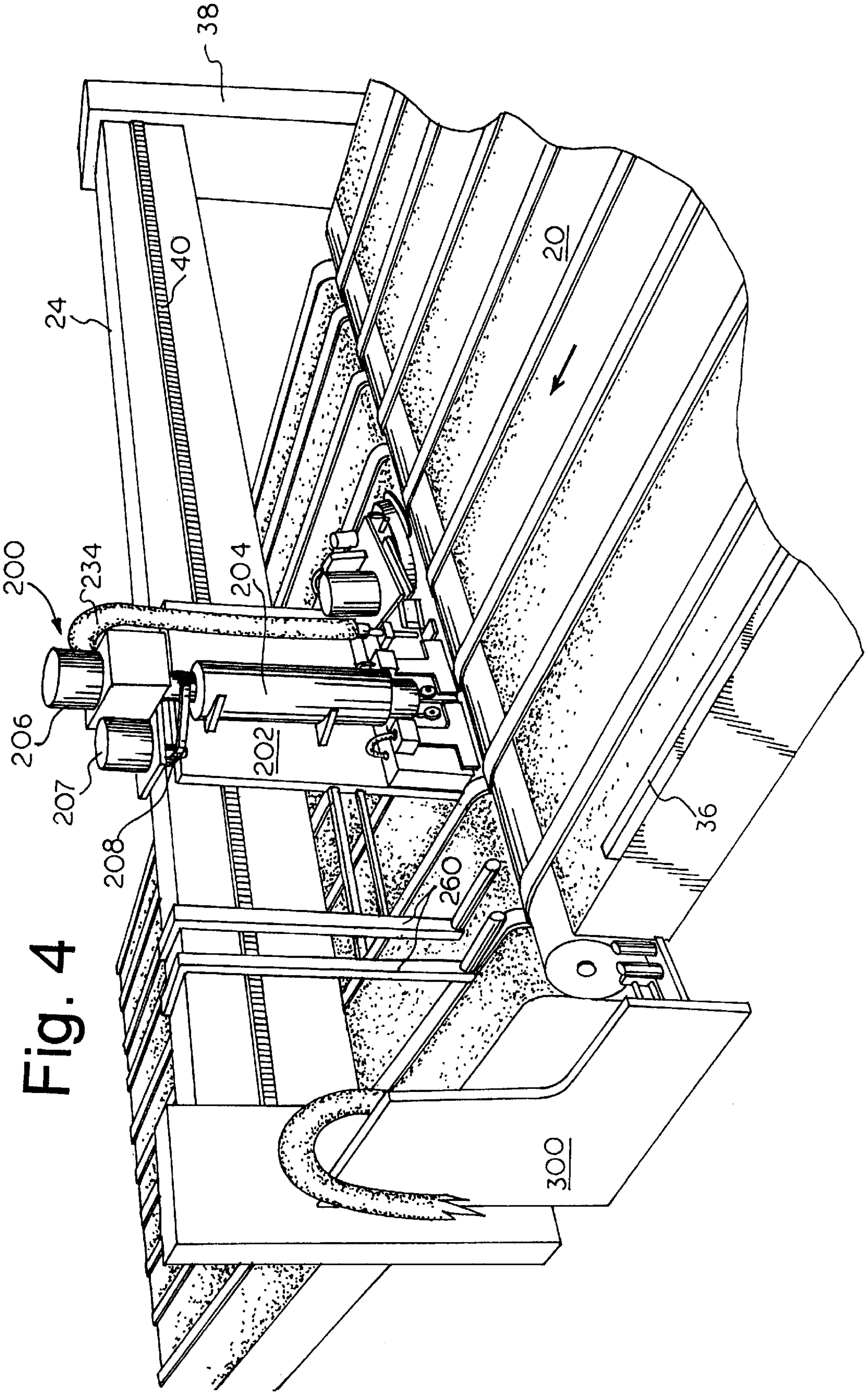
FIG. 4 is a perspective view showing a first travelling applicator head in the application station.

Followers 260, seen clearly in FIG. 4, which include extensions with TEFLON(™) or another suitable non-stick coating serve to support the feed of spacer material 30 above the glass surface 10, and prevent the adhesive from becoming fouled with the conveyor or work piece. The followers 260 are telescopically linked to the traveller 202 supporting the first travelling applicator head 200. As the head 200 moves transversely across the beam 24, the followers 260 expand the telescopic links to extend behind the first travelling head 200. As the head 200 returns to its home position A, the followers 260 collapse against the traveller 202.

The second stationary applicator head 300 is also supported on a traveller 302 which moves on the endless belt 40 of the transverse beam 24. The traveller 302 carries the stationary applicator head 300 to the home position A, operative when the glass is advanced by the conveyor and returns it to a resting position S, out of the way of the travelling head 200, until the next glass lite 10 is advanced. A lead gripper 322 is aligned on a unitary body 304 with a lag gripper 324 comprising an application channel 320 to apply spacer 30 in a straight configuration only. The lead gripper 322 includes a moveable front plate 323 which cooperates with a back plate 305. The lag gripper 324 similarly includes a moveable front plate 325 which also cooperates with the back plate 305. The feed of spacer material enters through the lead gripper 322 at an adjustable application angle as in the travelling applicator head 200. The feed of spacer material 30 includes horizontal and vertical rollers 326 which are adjustable vertically to change the angle of feed and horizontally to immobilize the spacer material 30 during cutting. As is visible in FIG. 8A, inside the channel 320 a pressure wheel 328 moveable in a vertical slot 329 is associated with each gripper 322, 324. In addition, a vertically moveable pressure pad 330 is also provided within the channel 320 of the lag gripper 324. The pressure pad 330 impinges on the end of the applied spacer material 30 after the cutting operation to maintain good contact between the cut end of the spacer 30 and the glass 10. The feed of spacer material 30 is lifted by the feed rollers 326 for cutting to permit an anvil 344 to be placed underneath the spacer 30 for support. It is important not to lift the applied spacer 30 from the glass 10 at the same time. The grippers 322, 324 are moveable by pneumatic cylinders to adjust the width of the channel and to immobilize the spacer material 30 during cutting. Between the lead 322 and lag 324 grippers a punch 340 and slitter knife 342 are provided with an associated anvil 344. During cutting both grippers 322, 324 are closed immobilizing and supporting the spacer material 30 at either side of the punch 340. The punch 340 and slitter 342 cut off the applied length of spacer material 30 leaving a semi-circular profile compatible with the cut made by the travelling applicator head 200 to the spacer 30 applied by that head 200, such that the two lengths of spacer 30 will fit together to form a tight square corner. At the same time, the ends of the feed spacer 30 within each applicator head 200, 300, also have a semi-circular profile for forming a tight first corner on the next glass assembly 10. The punch 340 is also provided with an evacuator 346 under vacuum pressure for collecting the excess spacer material 30. Two additional punches 350 may be provided on either side and oriented at right angles to the punch 340 and slitter knife 342 in order to cut circular holes through the spacer 30. The spacer 30 in this position is supported for striking the gas punches 350 by the front plates 323, 325 of the grippers 322, 324. As positioned at either side of the punch 340 and slitter knife 342, the punches 350 create a hole in the end of the spacer 30 applied to the glass 10 and in the beginning of the spacer 30 to be applied to the next glass assembly 10. Thus each length of spacer 30 applied by the stationary head 300 has a hole at either end. These holes can be used to introduce a gas, such as argon, which has superior insulating capacity over air, into the cavity between the glass lites of the assembly before it is sealed.

In general operation, as is illustrated in the schematic FIGS. 9–13, the first travelling head 200 applies spacer material 30 from a home position A to a first end 12 of a glass lite 10 while advancing across the transverse beam 24. A notch 32 is made in the spacer material 30. The first travelling head 200 rotates 90°, folding the spacer material 30 at the notch forming a tight, square corner, and the glass 10 is then advanced under the first travelling head 200 while spacer material 30 is applied to a first side 14 of the glass lite 10. When the first travelling head reaches the second end 16 of the glass lite 10, again a notch 32 is cut, and the head 200 rotates a further 90°, folding the spacer 30 again. Finally, the head 200 returns across the transverse beam 24 to the home position A applying spacer material 30 to the second end 16 of the glass lite 10, and the length of applied spacer material 30 is cut off. At the same time, the second stationary head 300 advances on the transverse beam 24 to the home position A. When the glass lite 10 is advanced by the conveyors 20, 22, the second stationary head 300 applies spacer material 30 to the second side 18 of the glass lite simultaneously with the first travelling head 200. At the end of the second side 18 the length of applied spacer material 30 is cut off. According to this method the travelling head 200 applies spacer material 30 to three sides of the glass lite 10, the fourth being applied by the stationary head 300. As a finishing step, the cut corners may be manually taped to prevent external moisture from entering the glass assembly.

As an automated station, the sequence of operations is initiated and controlled by a programmed CPU (Central Processing Unit) controller 34. Sensors are advantageously used to implement accurate operation. Individual sensors are not indicated in the figures. Their placement will be well understood by one skilled in the art. Initial parameters such as glass dimensions can be specified before a run begins, or sensors can be used to provide real time information such as the presence and location of the glass, spacer material or applicator heads. The use of sensors can ensure that spacer is always accurately placed without being dependent on exact timing etc. Sensors, preferably fiber optic sensors, are provided in the infeed and outfeed conveyors, on the travelling head to determine the width of the glass and its thickness, and in connection with the feed reels 26, 28. The sensors are advantageously used in pairs. A first slow down sensor is first to detect for example, the edge of the glass etc., the advance of the glass is then slowed down until the latch sensor is triggered. The latch sensor prescribes a distance to be advanced before bringing the glass to a stop in the correct position.

Individual movements of the applicator head 200 are actuated by servo motors 206, 244 and pneumatic cylinders for control of the grippers 222, 224 and the punch 230 and anvil 232 which are in turn activated sequentially by the CPU controller 34. (The numerous pneumatic leads and supply lines have been omitted for clarity.) Similarly, the larger drive mechanisms of the conveyors 20, 22, feed reels 26, 28, and the belt 40 for the applicator heads 200, 300 on the transverse beam 24 are also activated by the CPU controller 34. As a result, with a few specified parameters and initial set-up the station 100 can operate completely automatically. Clearly, the apparatus 100 can be used in a line operation which involves significant manual control as well.

A second glass lite is needed for assembly with the applied spacer and first glass lite. In an in-line production this will also come from the washing station, after which it may pass through the spacer application station 100 or it may be conveyed on a bypass conveyor (not shown). The controller 34 can be programmed to advance every other glass lite 10 without applying spacer material 30 saving both time and floor space.

In detailed the sequence of application is as follows. To begin operation the infeed conveyor 20 advances the glass 10 past a slow down fibre optic sensor in the conveyor 20. Once the leading edge 12 of the glass 10 has been detected by the sensor the glass 10 decelerates and continues towards a second latch sensor. Once the leading edge 12 of the glass 10 is detected by the latch sensor, the glass 10 will advance a specified distance further and come to rest with the leading edge at the home position A under the travelling head 200 which is also paused at the home position A. With the glass 10 in position, the travelling head 200 lowers to the appropriate application height. This is determined by an additional fiber optic sensor in the application head 200. Once the sensor detects the glass, applicator head 200 is prepared to apply spacer 30.

To begin application of spacer 30, the lead pressure wheel 226 moves downward compressing the spacer 30 between the wheel 226 and the glass surface 10. The lead gripper 222 then opens a sufficient distance to allow spacer 30 to pass through and acts as a guide with the back plate 227 to ensure correct placement of the spacer 30. The lag pressure wheel 226 is raised up above the spacer 30, and the lag gripper 224 is open. The travelling applicator head 200 supported by the traveller 202 is advanced by the endless belt 40 across the transverse beam 24 toward the opposite corner B of the glass 10. As the head 200 advances, spacer 30 is applied to the first end 12 of the glass lite 10 and is pressed for a secure seal by the lead pressure wheel 226. As the head 200 is advanced, the telescoping followers 260 automatically extend to support the spacer 30 feed above the glass 10. As the travelling applicator head 200 approaches the corner B, a slow down sensor on the applicator head 200 senses the corner B of the glass 10 and slows the advance of the head 200 until a latch sensor is activated to stop the glass 10 in the punch position.

As the travelling applicator head 200 advances across the transverse beam 24, the stationary applicator head 300 is also advanced on the transverse beam 24 to the home position A and lowered into position above the glass 10. The lead pressure wheel 328 is lowered to impinge on the spacer 30. The lead and lag grippers 322, 324 and the moveable feed rollers 326 open to permit the spacer 30 to pass through in the correct orientation.

The travelling applicator head 200 has stopped to punch a notch 32 in the spacer 30 prior to arriving at the corner B.

The lead gripper 222 closes to grip the spacer 30, the punch 230 is activated cutting and evacuating a plug from the spacer material 30, and the lead gripper 222 opens again.

The travelling head 200 then advances a discrete distance to the corner B of the glass 10, placing the head 200 in position to turn the lead 222 and lag 224 grippers. The lag pressure wheel 226 is lowered, the lead pressure wheel 226 is raised and the lag gripper 224 closes partially to hold the applied spacer 30 in place on the glass surface 10. The lead gripper 222 then closes tightly to hold the spacer 30, the head 200 is raised a fraction by the cam and drive device 210 to prevent the spacer from adhering to the glass surface on rotation. The lead assembly including the lead gripper 222 and the feed drive 240 turns 90° rotating about the central housing 204.

The grippers 222, 224 are now in a right angle configuration to form a tightly folded corner. The grippers 222, 224 ensure placement of the spacer in a good square corner. Once the lead gripper 222 has turned, the head 200 is lowered to the correct application height again. The lead pressure wheel 226 is lowered for further application. The lead gripper 222 opens to permit the spacer 30 to pass through.

To prepare for application to the next side 14 of the glass 10, the lag pressure wheel 226 is raised. The lag gripper 224 opens. The front plate 225 of the lag gripper 224 is raised up above the height of the spacer material 30 to permit the lag gripper 224 to rotate over the applied spacer 30, and the lag gripper 224 turns 90° around the central housing 204 to an aligned position with the lead gripper 222. The front plate 225 of the lag gripper 224 is again lowered to close the application channel 220 once the spacer applied to the end 12 of the glass 10 has been cleared.

Both applicator heads 200, 300 are now in position to apply spacer 30 to the opposing sides 14, 18 as the glass 10 is advanced by the conveyors 20, 22. The glass 10 is advanced under the heads 200, 300 and spacer 30 is applied to both sides 14, 18 of the glass lite 10. As the heads 200, 300 approach the second end 16 of the glass lite 10, a slow down fiber optic sensor in the outfeed conveyor 22 senses the leading edge 12 of the glass 10 and decelerates the glass 10 until it reaches a latch sensor which stops the glass 10 in the punch position.

The travelling applicator head 200 is stopped to remove a notch 32 from the spacer 30 prior to arriving at the corner C. The lead gripper 222 closes to grip the spacer 30 prior to punching. The pneumatic punch 230 is activated and removes a plug of spacer material 30 which is evacuated. The lead gripper 222 then opens, and the travelling head 200 advances a discrete distance to the corner C of the glass 10, placing the head 200 in position to turn the lead 222 and lag 224 grippers.

At the same time the stationary head 300 raises the feed rollers 326 raising the angle of the spacer material 30 from the glass 10. Once at corner C, the spacer applied by head 300 is cut off and placed on the glass as follows: the feed rollers 326 close, the lead gripper 322 closes, and an anvil 344 extends underneath the spacer 30 for the punch 340 and slitter knife 342 to cut against. The punch 340 is activated in cooperation with a slitter knife 342 to cut a profile in the end of the spacer material 30 which matches the notched cuts of the folded corners. The anvil 344 retracts and the pressure pad 330 is lowered to press the end of the applied spacer 30 firmly to the glass 10. The stationary head 300 then returns to its resting position S out of the way of the travelling head 200.

In order to form a second corner C, the travelling head 200 lowers the lag pressure wheel 226 and raises the lead pressure wheel 226. The lag gripper 224 closes partially to hold the applied spacer 30 in place on the glass surface 10. The lead gripper 222 closes tightly to hold the spacer 30, then the head 200 is raised a fraction by cam action 210 to prevent the spacer 30 from adhering to the glass surface when turning. The lead gripper 222 with the lead assembly then turns from 90° to 180° about the central housing 204. The lead and lag grippers 222, 224 hold the spacer 30 in a tight right angle configuration. The head 200 is again lowered into its application position. The lead pressure wheel 226 is lowered for further application. The lead gripper 222 opens, the lag pressure wheel 226 is raised, the lag gripper 224 opens, and the front plate 225 of the lag gripper 224 is raised up to clear the height of the applied spacer 30. The lag gripper 224 then turns 90° to 180° about the central housing 204 to align with the lead gripper 222. The front plate 225 of the lag gripper 224 is lowered into position again once the spacer applied to lateral side 14 has been cleared.

Finally the travelling applicator head 200 must apply spacer 30 along the second end 16 of the glass 10. The head 200 is advanced on the transverse beam 24 toward the home position A applying spacer material to the second end 16 of the glass 10. As the travelling head returns toward the home position A, the telescoping followers 260 are automatically collapsed again while no longer necessary. The sensors stop the head 200 at the punch position to simultaneously notch the spacer material 30 and cut off the length of applied spacer 30. The lead gripper 222 closes to hold the spacer material 30. The slitter knife 236 engages with the punch 230. The anvil 232 is extended under the spacer 30 below the punch 230, and the punch 230 and slitter knife 236 are activated to cut fully through the spacer 30 forming a notched profile to match the end of the spacer 30 applied by the stationary applicator head 300.

Once the spacer 30 has been cut, the lag pressure wheel 226 is lowered to press the final length of applied spacer 30 down firmly in the corner area. The lead gripper 222 opens. The lead pressure wheel 226 is raised up, the lead gripper 222 opens, and the head 200 advances a discrete distance to corner D. The spacer 30 is now fully applied to the periphery of the glass 10. The lag pressure wheel 226 is raised up, and the front plate 225 of the lag gripper 224 is raised to clear the applied spacer 30. The completed unit is then advanced by the oufeed conveyor 22 out of the applicator station 100.

To prepare for the next application, the travelling head 200 must feed spacer 30 into the application channel 220 and then rotate back 180° to the home position A.

Variations of the present invention include configurations for non-standard and non-rectangular windows, for instance, to adjust the rotation of the travelling head and movement of the conveyors for corners of more or less than 90° or of irregular shape including round or rounded portions.

The transverse beam as describe above is fixed relative to the conveyors. In an alternative embodiment the beam is moveable, carrying the applicator heads in the longitudinal direction in addition to transversely. Movement can be coordinated with that of the conveyors or can be incorporated over a fixed surface such as a float table. The standards of the transverse beam may be driven, for example, in a fixed track for controlled movement.

Many stations in the art of insulated window assembly have been designed for transfer of the glass substrate in a substantially vertical orientation. Adapters for rotating the glass to a substantially horizontal position are available for use with the present invention. As an alternative the application station herein described may be adapted for substantially vertical application.

Other combinations of travelling and stationary heads are also possible within the scope of the present invention. For instance, two travelling heads may be operated sequentially on separate transverse beams in the conveying path. Alternatively, a single travelling head may apply spacer to all four sides of the substrate. It will be understood that various modifications can be made to the above-described embodiments without departing from the spirit and scope of the invention and the preferred embodiments described.

I claim:

1. A traveling applicator head for applying adhesive spacer material to a substrate in a spacer application station in the production of insulated windows, comprising:

a traveler for supporting the applicator head at a distance from the substrate;

a drive means for selective transverse reciprocating movement of the traveler and the applicator head;

a central housing rotatively supporting the applicator head on the traveler;

a lead gripper comprising a pair of lead gripper members defining a first channel therebetween;

a lag gripper comprising a pair of lag gripper members defining a second channel therebetween, at least one of said lag gripper and said lead gripper being mounted for pivotal movement relative to the other of said lead gripper and said lag gripper, defining in combination with the lead gripper an application channel for positioning the spacer material on the substrate.

2. The travelling applicator head as defined in claim 1 further comprising a pressure means within the application channel for applying pressure to the spacer material received therein against the substrate.

3. The traveling applicator head as defined in claim 2, wherein the pressure means comprises a first pressure wheel within the lead gripper and a second pressure wheel within the lag gripper, each vertically moveable from an engaged position impinging on the spacer material within the application channel to a released position above the spacer material.

4. The travelling applicator head as defined in claim 2 further comprising a controlled feed means for advancing the spacer material into the application channel.

5. The travelling applicator head as defined in claim 4 wherein the controlled feed means comprises a pair of cooperating high friction belts and a pneumatic cylinder to adjust the tension between the pair of belts to regulate the feed of said spacer material in response to the variable density of the spacer material.

6. The travelling applicator head as defined in claim 4, wherein the controlled feed means comprises a dedicated drive means operatively connected to a feed wheel by a belt, and cooperating guide rollers.

7. The travelling applicator head as defined in claim 1, wherein the applicator head is vertically moveable above the surface of the substrate.

8. The travelling applicator head as defined in claim 7, wherein a cam shaft and an independent drive means are provided in cooperation with a supporting beam to lift the applicator head above the substrate.

9. The travelling applicator head as defined in claim 1, wherein rotation of the applicator head is controlled by a rotary drive means in cooperation with a timing belt secured to the central housing.

10. A traveling applicator head as defined in claim 1, wherein the central housing comprises two concentric shafts pivotally connecting the lead and lag grippers for movement from a first substantially aligned position wherein said lead and lag grippers are substantially aligned relative to each other, for applying spacer material, to a second configuration wherein the lead and lag grippers are disposed at substantially 90° relative to each other for applying the spacer material to corners of the substrate.

11. The travelling applicator head as defined in claim 10, wherein the lead gripper and the lag gripper are each selectively moveable from an operative position permitting the spacer material to pass through the application channel to an immobilized position securing the spacer material within the application channel independently of one another in a coordinated sequence.

12. The travelling applicator head as defined in claim 11, wherein the lag gripper is additionally selectively moveable in a vertical orientation above the substrate to permit the lag gripper to pivot over the spacer material in a coordinated sequence as the lag gripper returns to said aligned position from said second configuration after applying the spacer material to at least one of said corners.

13. The travelling applicator head as defined in claim 1 further comprising a cutting member and a cooperating anvil for cutting a notch in the spacer material in the area of the spacer material which is bent when applied to at least one of said corners.

14. The traveling applicator head as defined in claim 1 further includes at least one follower telescopically linked to the traveller for supporting the spacer material above the substrate.

15. The traveling applicator head as defined in claim 1 wherein said lag gripper is mounted for pivotal movement relative to said lead gripper.

* * * * *